(12) United States Patent
Robsman et al.

(10) Patent No.: US 6,446,225 B1
(45) Date of Patent: Sep. 3, 2002

(54) SERVER SYSTEM WITH SCALABLE SESSION TIMEOUT MECHANISM

(75) Inventors: Dmitry Robsman, Bellevue; Murali R. Krishnan, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/066,507

(22) Filed: Apr. 23, 1998

(51) Int. Cl.[7] .......................... H02H 3/05; G06F 1/14; G06F 15/16
(52) U.S. Cl. .................. 714/55; 709/227; 709/228; 709/229; 713/502
(58) Field of Search .................... 714/51, 55, 731, 714/744, 814, 815; 710/45, 117, 118, 124; 713/500, 502; 709/227, 228, 229

(56) References Cited

U.S. PATENT DOCUMENTS

| | | | | |
|---|---|---|---|---|
| 5,870,629 A | * | 2/1999 | Borden et al. | 395/864 |
| 5,999,979 A | * | 12/1999 | Vellanki et al. | 709/232 |
| 6,006,266 A | * | 12/1999 | Murphy, Jr. et al. | 709/227 |
| 6,012,090 A | * | 1/2000 | Chung et al. | 709/219 |
| 6,018,619 A | * | 1/2000 | Allard et al. | 395/200.54 |
| 6,070,190 A | * | 5/2000 | Reps et al. | 709/224 |
| 6,088,728 A | * | 7/2000 | Bellemore et al. | 709/227 |
| 6,134,588 A | * | 10/2000 | Guenthner et al. | 709/226 |

* cited by examiner

*Primary Examiner*—Peter Wong
*Assistant Examiner*—Tim Vo
(74) *Attorney, Agent, or Firm*—Lee & Hayes, PLLC

(57) ABSTRACT

A session manager has a session timeout mechanism to selectively timeout client-server sessions. The session timeout mechanism has multiple timeout buckets to hold corresponding groups of sessions according to the sessions' timeout periods. Sessions located in different ones of the timeout buckets are set to timeout at different times. The session manager also has a session timeout clock that is incremented every predetermined time unit (e.g., every minute). The session timeout clock maintains a pointer to one of the timeout buckets and advances that pointer with each clock increment. The session timeout clock advances the pointer through all of the timeout buckets, one bucket at a time. The session timeout clock advances the pointer repeatedly through all the buckets. The cycle time for the session timeout clock to reference every timeout bucket is equal to the incremental time unit multiplied by the number of buckets. A new session (or one that recently received a request and is restarting its timeout period) is inserted into a timeout bucket that is one or more buckets ahead of the clock pointer, depending upon the session's timeout period. When the timeout clock references a particular bucket, the sessions in that bucket are analyzed for possible timeout. Sessions whose timeout period has run without receiving any new requests are timed out and removed from the bucket.

40 Claims, 7 Drawing Sheets

SERVER SYSTEM WITH SCALABLE SESSION TIMEOUT MECHANISM

TECHNICAL FIELD

This invention relates to servers for computer network systems. More particularly, this invention relates to a timeout mechanism for selectively timing out client-server sessions on the server.

BACKGROUND

A computer network system has one or more host network servers connected to serve data to one or more client computers over a network. In a typical exchange, a client sends a request for data and/or services to a server over the network. The server processes the request and returns a response.

The server runs an operating system to handle communication interaction with client-based applications. The server operating system establishes the connection between the server and the client and allocates resources to handle requests from the client. When a client first connects to the server, the server operating system creates a new session for the client. The sessions are cached according to their ID in a main session table. All requests and responses are handled through the client session. When the client is finished submitting requests to the server, the session for that client is terminated.

One way to terminate a session is through session timeout. A "session timeout" occurs when no requests for a particular session are received at the server for a specified period of time. Each session can potentially have its own timeout period. Usually, the session timeout is defined in time units that are more appropriate for humans, rather than a micro scale suitable for fast executing machines. For example, it is common to set a session timeout to five minutes, rather than 303,142,489 microseconds. Furthermore, timeout accuracy need not be precise. If a timeout period for a session is set to five minutes and that session times out at five minutes and twenty seconds, the extra twenty second "error" is typically acceptable as being within the timeout parameters.

Session timeout management is particularly useful in the context of the Internet. It is not uncommon for a client to request certain data and/or services, and then browse to another site without expressly terminating its current session. The Web server starts a session for the client, and that session remains active until it is timed out. For popular Web sites, many sessions (e.g., hundreds to thousands) may be simultaneously opened to serve the clients. When clients leave without disconnecting, the Web server is often left with many open sessions that never again receive active requests. Unused open sessions unnecessarily consume server resources that could better be allocated to serving new clients. To improve performance, the Web server times out client sessions when no requests have been received for a predefined time period.

When designing server applications, one important consideration is scalability. Scalability implies that more resources yield more performance. One primary limitation on performance, and hence on scalability, is lock contention. "Lock contention" is a condition in which multiple server threads try to access the same resource simultaneously, thereby locking each other out of the resource. Adding more resources, such as more processors, does not alleviate the lock contention problem.

Lock contention is particularly visible in session timeout management. When a new session is added, the main session table is locked to prevent other threads from disrupting the table's composition while the session is being added. When a session times out, the table is locked again to allow removal of the session. Locking during insertion and removal of sessions is unavoidable, and unfortunately impedes processing and hampers performance.

One conventional solution is to multiplex access to the session table based on an arbitrary ID. The session table is partitioned into several tables according to session ID (e.g., using harsh partitioning) and locks are asserted separately on a partition basis. Even with this multiplexing, there remains a need for an improved mechanism to time out sessions in a way that does not add any additional lock contention to the main session table.

Session table lockout is just one example of lock contention problem. Essentially, the lock contention problem is evident anytime multiple threads are accessing the same data structure.

This invention is directed to an improved method for managing sessions, and other resources, in a manner that minimizes lock contention.

SUMMARY

This invention concerns a session timeout mechanism for managing sessions in a manner that minimizes lock contention. As a result, the session timeout mechanism is scalable.

According to one implementation, a network server system has a session manager to manage client-server sessions. When a client connects to the server, the session manager initiates a corresponding session to facilitate communication between the server and the client. The session manager places the session in a session table. The session has an associated timeout period dictating when the session is to be terminated in the event that no further requests are received from the client.

The session manager includes a session timeout mechanism to selectively timeout client-server sessions in a manner that minimizes lock contention on the main session table. The session timeout mechanism has multiple timeout buckets to hold corresponding groups of sessions according to the expected timeout moment. Sessions located in different ones of the timeout buckets are set to timeout at different times.

The session manager also has a session timeout clock that is incremented every predetermined time unit (e.g., every minute). The session timeout clock maintains a pointer (e.g., index) to one of the timeout buckets and advances that pointer with each clock increment. The session timeout clock advances the pointer through all of the timeout buckets, one bucket at a time. The session timeout clock advances the pointer repeatedly through all the buckets. The cycle time for the session timeout clock to reference every timeout bucket is equal to the incremental time unit multiplied by the number of buckets.

When the timeout clock references a particular bucket, the sessions in that bucket are analyzed for possible timeout. Sessions whose timeout period has run without receiving any new requests are timed out and removed from the bucket.

A new session (or one that recently received a request and is restarting its timeout period) is inserted into a timeout bucket that is one or more buckets ahead of the clock pointer, depending upon the session's timeout period. For instance, if the incremental clock interval is one minute and the session's timeout period is five minutes, the session is placed in the fifth timeout bucket ahead of the currently referenced timeout bucket. As the pointer is eventually advanced to the fifth timeout bucket (now the current bucket), a time period of at least five minutes will have elapsed. If the session has received no new requests in the interim, the session manager times out the session and removes it from the bucket.

BRIEF DESCRIPTION OF THE DRAWINGS

The same reference numbers are used throughout the figures to reference like components and features.

DETAILED DESCRIPTION

Figure 1:
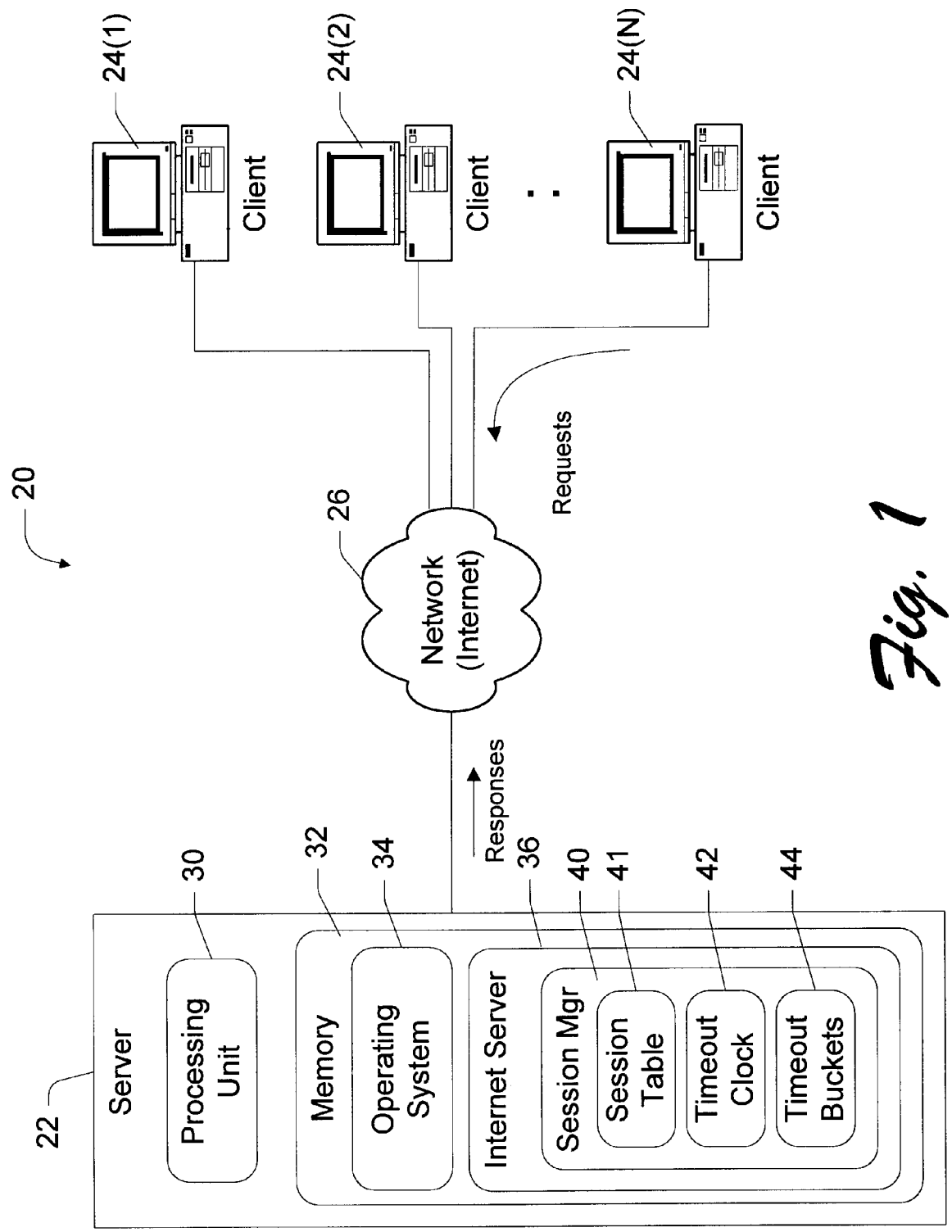
FIG. 1 is a diagrammatic illustration of a client-server system having a host network server and multiple clients.

FIG. 1 shows the computer network system 20 having a host network server 22 connected to serve multiple clients 24(1), 24(2), . . . , 24(N) over a network 26. The network 26 is representative of many diverse network technologies (e.g., Ethernet, satellite, modem-based, etc.) and different configurations, including a LAN (local area network), a WAN (wide area network), and the Internet. For discussion purposes, the computer network system 20 is described in the context of the Internet, whereby the network server 22 is a Web server that provides services and/or data to the clients 24(1)–24(N) over the Internet 26. It is noted, however, that this invention may be implemented in other networking contexts, including LAN and WAN configurations.

The server 22 has a processing unit 30 and a memory subsystem 32. The memory subsystem 32 includes both volatile memory (e.g., RAM) and non-volatile memory (e.g., ROM, hard disk drive, floppy disk drive, CD-ROM, etc.). The network server 22 runs a network server operating system 34 that is stored in memory 32 and executed on the processing unit 30.

In the preferred implementation, the operating system 34 is the Windows NT server operating system from Microsoft Corporation, which is modified to incorporate the session timeout mechanism described below. The Windows NT server operating system is a multitasking, extensible, scalable operating system that can be implemented on standard personal computers. The Windows NT server operating system is well documented. For background information, the reader is directed to the book entitled Inside Windows NT, which is written by Helen Custer and is published by Microsoft Press (copyright 1993). This book is incorporated by reference.

As one example implementation, the network server 22 is a microprocessor-based personal computer configured with the Windows NT server operating system and a Web server application (e.g., Internet Information Server (IIS) from Microsoft Corporation). It is noted, however, that other server configurations (e.g., workstation, minicomputer, etc.), operating systems (e.g., a UNIX-based operating system), and Web server applications can be used to implement aspects of this invention. Furthermore, an implementation can be configured to run on the Windows 95 operating system, or other derivations of the Windows operating system.

The network server 22 also runs an Internet server 36 that is stored in memory 32 and executed on the processing unit 30 atop the operating system 34. As one example, the Internet server 36 is implemented as the Internet Information Services (IIS) server application available from Microsoft Corporation, which is modified to include the session timeout mechanism described below.

The Internet server 36 implements a session manager 40 to manage client sessions. The session manager 40 initiates a session when a client connects to the server and managers the active session while the client is submitting requests and receiving responses. The session manager 40 is also responsible for timing out sessions that are no longer being used.

The session manager 40 caches the sessions in a session table 41. Each session entry in the table 41 includes a session ID, session data, a length of timeout, and an ID of a timeout bucket (discussed below). The sessions may be arranged in table 41 according to their session ID. The timeout period may be a custom value, or a default period assigned by the session manager to all sessions. Further, the timeout period may be expressed in terms of an absolute time value, as determined by the session timeout clock (discussed below), or this absolute time value may be added in the session table.

The session manager 40 has a timeout clock 42 that incrementally tracks units of a specified granularity since the server is first started. Assuming the server starts at 0, the timeout clock 42 increments this value by 1 for each passing unit of granularity. While the timeout clock 42 is separate from the system clock, it uses the system to clock to derive its time increments. Essentially any time interval can be used as the clock interval. For instance, the timeout clock may be set to increment each second, minute, or 5-minute interval since startup. For purposes of discussion, examples described throughout this disclosure assume that the timeout clock 42 has a clock interval of one minute.

The timeout clock 42 counts each increment since the clock is started. As a result, the timeout clock 42 maintains an absolute time measured in time units, such as one-minute intervals, since the server system was started up.

The session manager 40 groups sessions into timeout buckets 44 according to the sessions' timeout periods. A session is placed into the particular bucket that corresponds to the timeout clock value when the session is to time out if no new requests are received. Sessions in different timeout buckets are set to timeout out at different times. At any given time, a session belongs to at most one timeout bucket. When the session is allotted to a particular bucket, the session's corresponding table entry in the session table 41 is updated with the bucket ID of the particular bucket.

Figure 2:
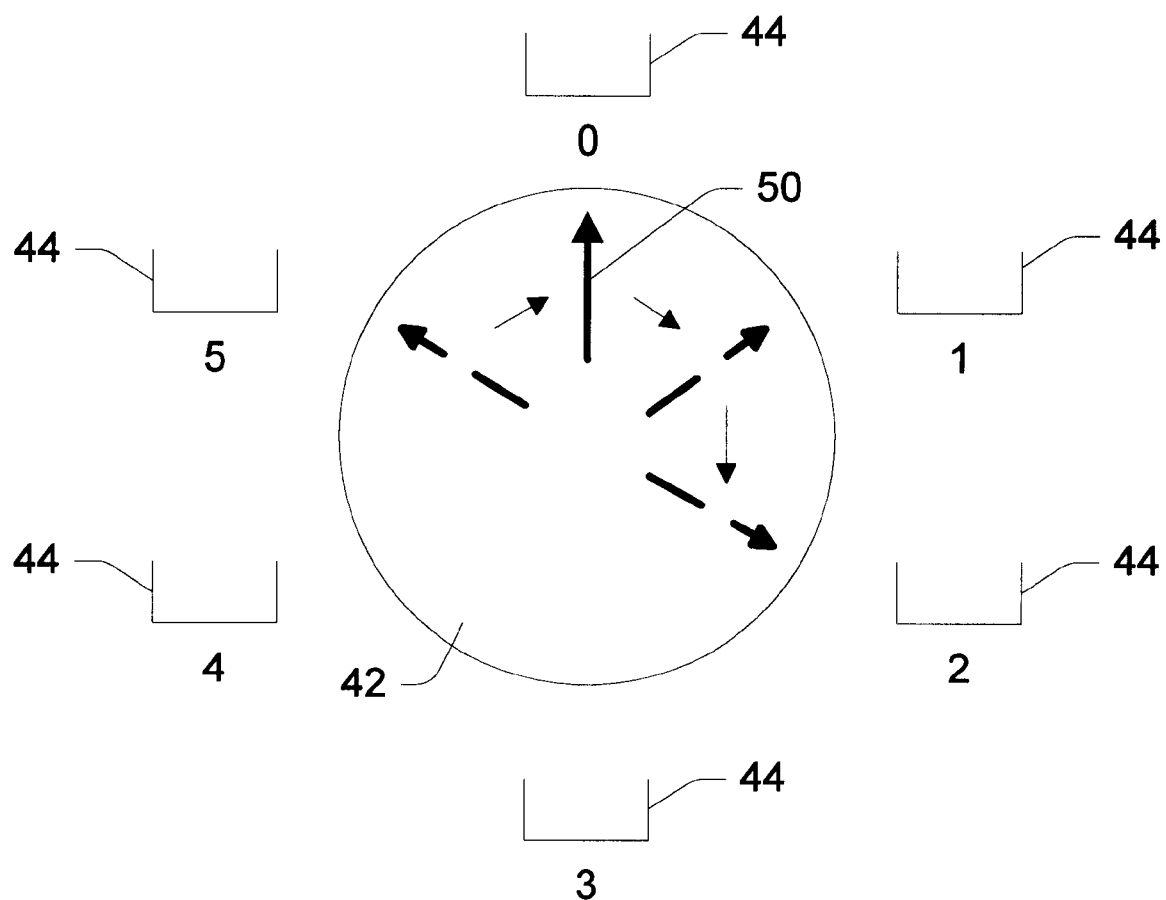
FIG. 2 is a diagrammatic illustration of a session timeout mechanism used by the server to manage client-server sessions. The session timeout mechanism includes a timeout clock and multiple timeout buckets.

FIG. 2 illustrates conceptually how the timeout clock 42 and timeout buckets 44 operate. The number of buckets 44 is arbitrary. As default, the number of timeout buckets 44 is determined by the default session timeout period of the sessions, according to the following relationship:

Number of Timeout Buckets=Default Timeout Period+1

If, for example, the administrator sets the default timeout period to five clock intervals (e.g., five minutes), the session manager creates six buckets. This is the case shown in FIG. 2, wherein the six buckets 44 are labeled 0 through 5. This formula derives an optimum number of buckets in terms of performance because essentially all buckets are in use during operation.

The timeout clock 42 maintains a pointer 50 to the current bucket whose sessions are being timed out. In this example, the pointer 50 is referencing bucket 0, which is considered to be the "current" or "timeout" bucket. With each clock increment, the timeout clock 42 advances the pointer 50 to the next bucket, as illustrated by the clockwise movement to dashed pointers. The pointer 50 is advanced bucket-by-bucket with each clock increment, thereby repeatedly cycling through the timeout buckets in a continuous clockwise circle. As the timeout clock 42 advances the pointer 50, each consecutive bucket that it references has the sessions therein analyzed for time out.

A new session is added to one of the buckets 44 according to its predicted session timeout. The specific bucket is one or more buckets away from the current bucket being referenced by the timeout clock pointer 50. By placing the sessions in buckets in advance of the pointer 50, the sessions are kept active for the duration it takes for the timeout clock 42 to move the pointer 50 to the buckets holding the sessions. In this manner, the pending timeout can be readily measured by the number of intermediate buckets between the pointer and the session bucket. For instance, if the pointer is referencing bucket 2 and the session is in bucket 5, that session is scheduled to timeout in three clock intervals (e.g., three minutes) because it will take the pointer three clock increments to move from bucket 2 to bucket 5.

When placing a session into a timeout bucket, the appropriate timeout bucket number is derived as follow:

Bucket Number=(Absolute Time+Timeout Period+1)modulo Number of Buckets

As an example, suppose the absolute time in the timeout clock is 5,486 units (e.g., 5,486 minutes since the server was started up). At this time, the timeout clock pointer 50 references bucket 2. If the timeout period for a given session is three clock units (e.g., three minutes), the session is placed in bucket 0 (i.e., (5486+3+1)mod 6).

This computation can be restated more simply in terms of the bucket numbers, as follows:

Bucket Number=(Current Bucket Number+Timeout Period+ 1)modulo Number of Buckets

The "current bucket number" is the number of the bucket being referenced by the timeout clock pointer 50. In this case, if the current bucket number is 2 and the session timeout period for a given session is three clock units (e.g., three minutes), the session is placed in bucket 0 (i.e., (2+3+1)mod 6).

As noted above, each session entry in the table 41 contains an associated timeout bucket number. When the pointer 50 is moved to a bucket, the sessions in that bucket are analyzed for time out. In FIG. 2, the pointer 50 is presently referencing bucket 0. All sessions in bucket 0 are assessed for timeout. Those sessions whose timeout period has lapsed are timed out. New sessions that are subject to being timed out in the future are added to one of the buckets 1–5 in advance of bucket 0. When the pointer advances to bucket 1 after the prescribed clock interval (e.g., one minute), the sessions in bucket 1 are examined for time out and new sessions are added to one of the buckets 2–5 and 0. In this configuration, all timeout buckets are being used in the process.

If all sessions share the same default session timeout period (i.e., one less than the total number of buckets), all new sessions will be filling the timeout bucket that the pointer just left and all sessions in the currently referenced bucket will be timed out. For instance, in FIG. 2, when the pointer is at bucket 0, all sessions in bucket 0 are timed out and all new sessions are added to bucket 5. When the pointer is advanced to bucket 1, all sessions in bucket 1 are timed out and all new sessions are added to bucket 0. In this manner, all sessions will experience the full five unit default timeout period as the pointer is advanced through five consecutive buckets.

It is noted, however, that many other configurations are possible. Conceptually, at any given time, the buckets in advance of the pointer 50 are continuously being filled with sessions that are subject to being timed out. Concurrently, sessions in the current bucket referenced by the pointer 50 are being analyzed for possible time out.

Figure 3:
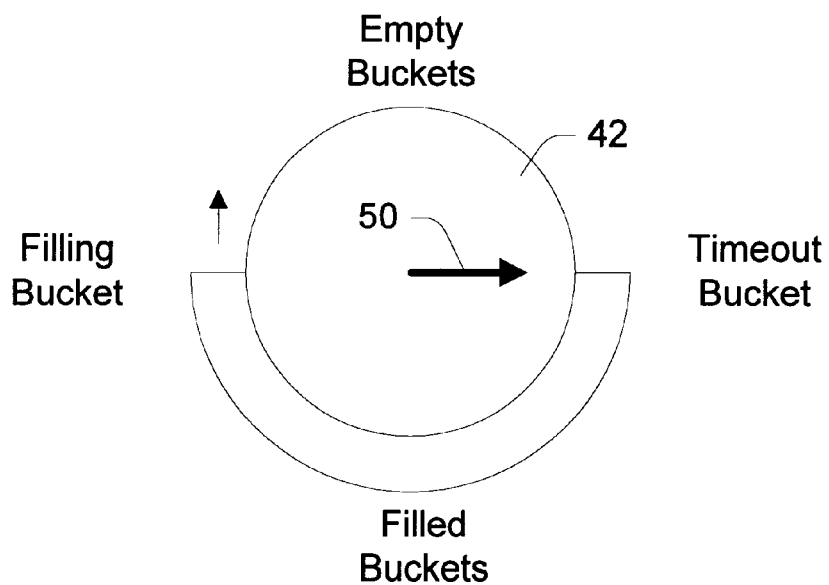
FIGS. 3–4 show a relationship between the timeout clock and the timeout buckets during operation.
Figure 4:
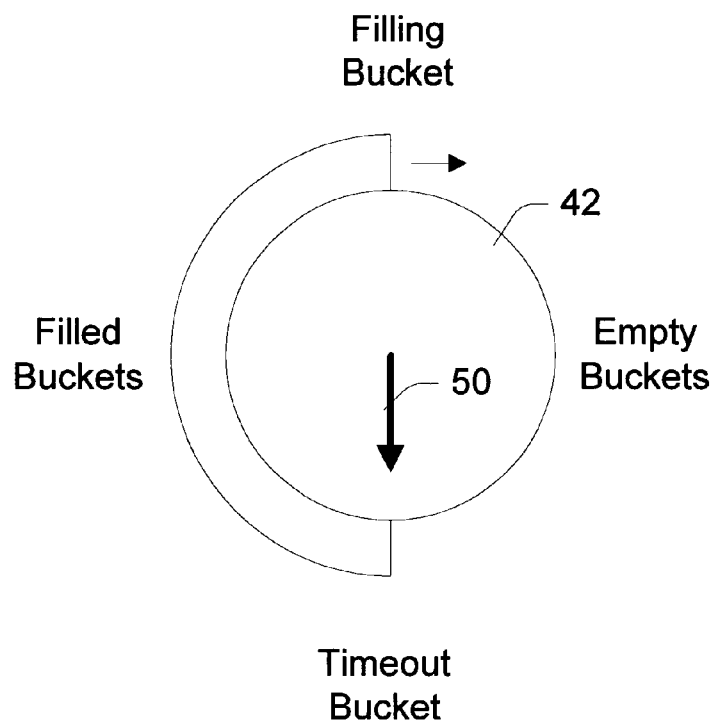

FIGS. 3 and 4 illustrate this concept for the case where the session timeout is one-half the duration it takes the timeout clock to cycle all the buckets. Suppose there are 20 timeout buckets and the session timeout is 10 clock units. In FIG. 3, the pointer 50 is referencing the "timeout" bucket, which is being emptied as sessions are timed out. Simultaneously, a "filling" bucket that is one-half of the clock cycle time ahead of the timeout bucket is receiving all of the new sessions. All buckets ahead of the timeout bucket and lagging the filling bucket are filled with sessions waiting to be timed out at the respective times, as represented by the semicircle along the outer rim. All buckets ahead of the filling bucket and before the timeout bucket are empty.

FIG. 4 shows the situation after the pointer 50 has advanced one-quarter of the clock cycle time. Here, the pointer 50 is referencing a new "timeout" bucket and the opposing bucket one-half cycle ahead is the new "filling" bucket. Again, all buckets ahead of the timeout bucket and lagging the filling bucket are filled with sessions waiting to be timed out and all buckets ahead of the filling bucket but before the timeout bucket are empty.

It is noted that configuration is less optimal in terms of the number of buckets in relation to the default session timeout, as compared to the arrangement shown in FIG. 2. In FIGS. 3 and 4, half of the buckets go unused during the clock cycle, resulting in less efficient utilization of the buckets.

In the previous two examples, the sessions are assumed to have session timeouts that are less than one clock cycle. However, the sessions may have a timeout value that is greater than one clock cycle. For instance, a session may have a lifetime that spans several full circles of the timeout clock. The session with a multi-cycle session timeout period is placed in the bucket having a number computed as follows:

Bucket Number=(Current Bucket Number+Timeout Period+ 1)modulo Number of Buckets

Consider an example with reference to FIG. 2. With the pointer 50 at bucket 0, suppose a new session has a timeout period of 20 clock units (e.g., 20 minutes). Since one clock cycle is six units (i.e., six buckets times one clock unit per bucket), the session is placed in bucket 2 (i.e., (0+20)mod 6).

In such cases, at any given bucket, not all sessions are necessarily timed out. To avoid being prematurely timed out, the session retains both the bucket number and the timeout clock value as part of its table entry in the session table 41. As noted above, the timeout clock tracks an absolute timeout clock value since the server is started. For instance, suppose the timeout clock value is currently 83,471 units (e.g., 83,471 minutes since startup) when the pointer 50 references bucket 0. The session adds its session timeout period of 20 units to the current timeout clock value 83,471 to obtain an absolute time value for the session timeout period of 83,491.

When the pointer is advanced to bucket 2 in the first cycle, the timeout clock will only have incremented to 83,473 and hence the session should not time out. If the session had simply retained the bucket number (i.e., bucket 2) without the absolute clock value, the session would be improperly timed out just two clock ticks after the session is added to the buckets, rather than the desired 20 ticks. On the next cycle, the timeout clock will be at 83,479. Once again, the session is not timed out. On the third pass, the timeout clock will be at 83,485 and the session still should not be timed out. Finally, on the fourth pass by bucket 2, the timeout clock will have an absolute value of 83,491, thereby matching the absolute time value of the timeout period. If the session has not received a request in the interim, the session is timed out.

Figure 5:
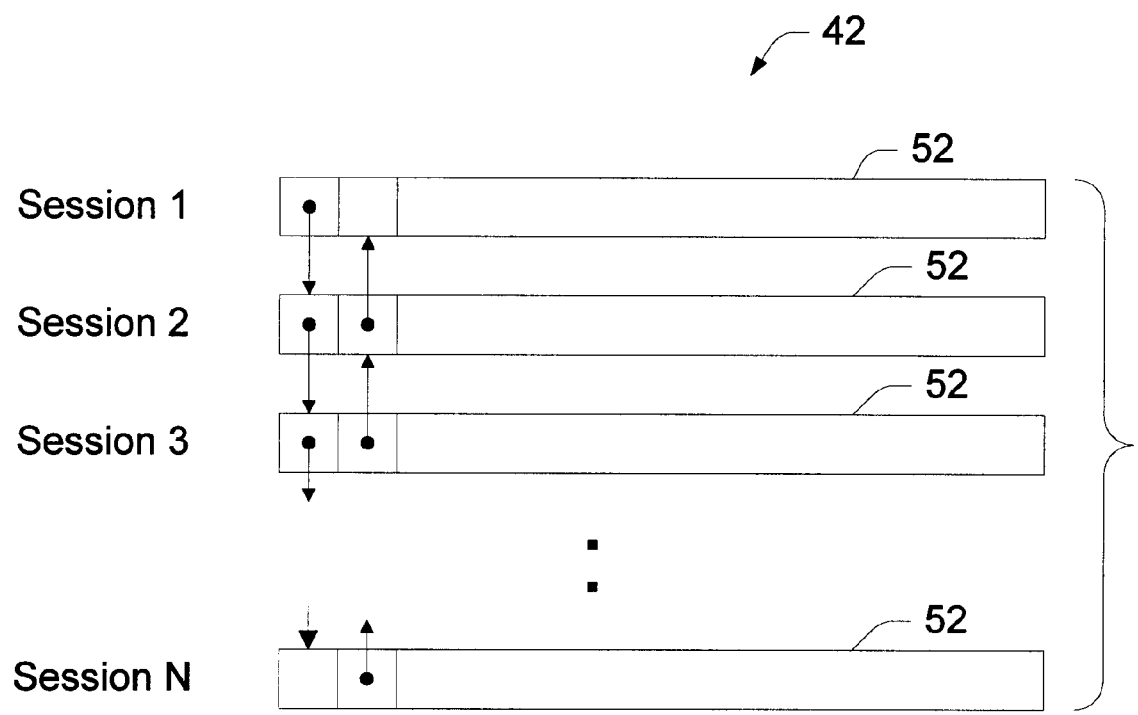
FIG. 5 is a diagrammatic illustration of a timeout bucket implemented as a linked list of sessions.

FIG. 5 shows one possible implementation of a timeout bucket 44. In this example, the timeout bucket 44 comprises a linked list of sessions 52. When a session is placed in a timeout bucket 44, it is linked to another session in the bucket. More particularly, the timeout bucket is a doubly linked list, wherein each session 52 has a pointer to a previous session and a pointer to a subsequent session. Since sessions are merely added to a bucket, or removed from a bucket, a linked list is an efficient structure to accommodate the session timeout operations. The timeout mechanism simply walks the linked list to locate desired sessions within the bucket. No searching is needed. This is an advantage over the prior art because there is no need to search the entire session table 41, or partitioned portions of it, to locate the desired sessions.

Figure 6:
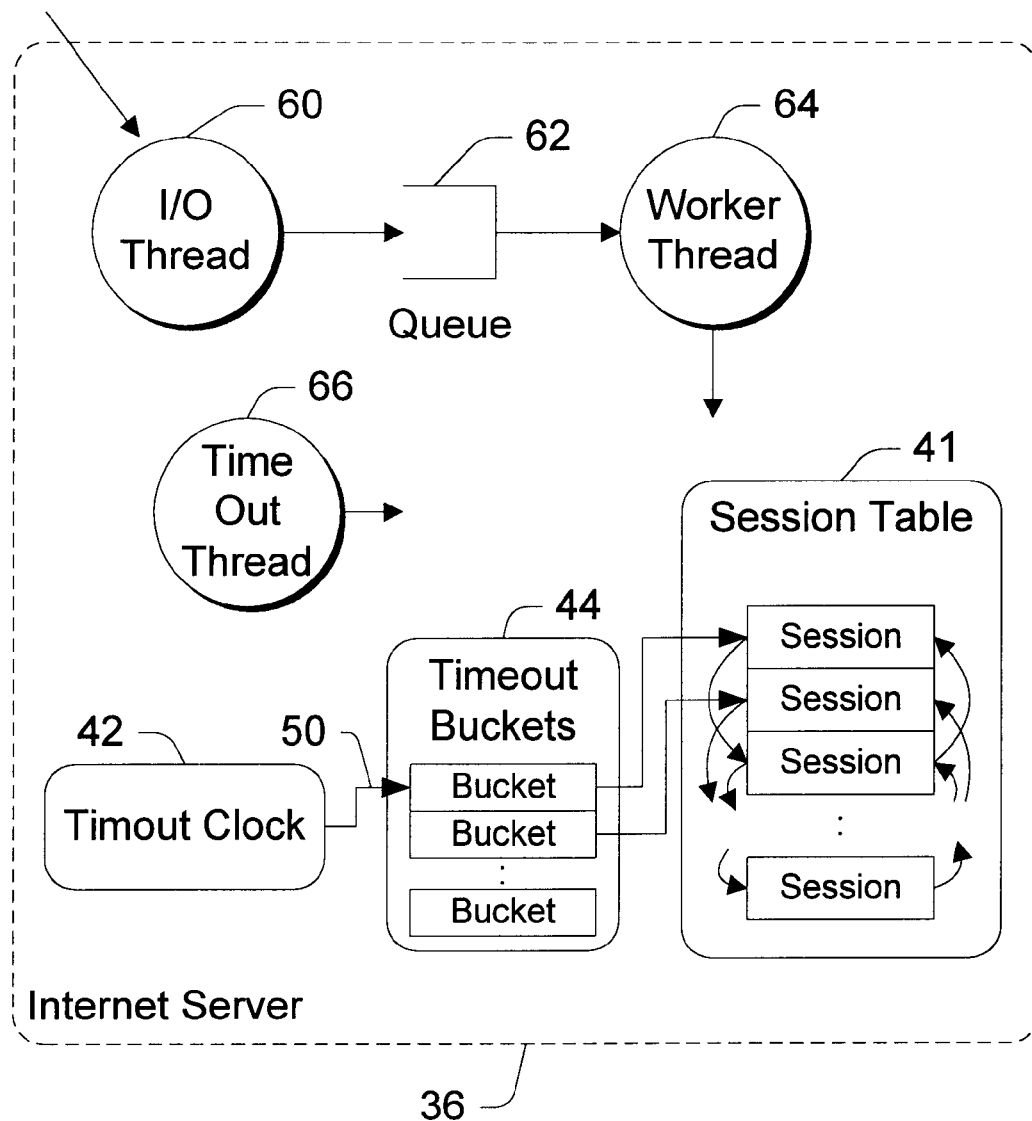
FIG. 6 is a functional block diagram of an Internet server that implements the session timeout mechanism of FIG. 2.
Figure 7:
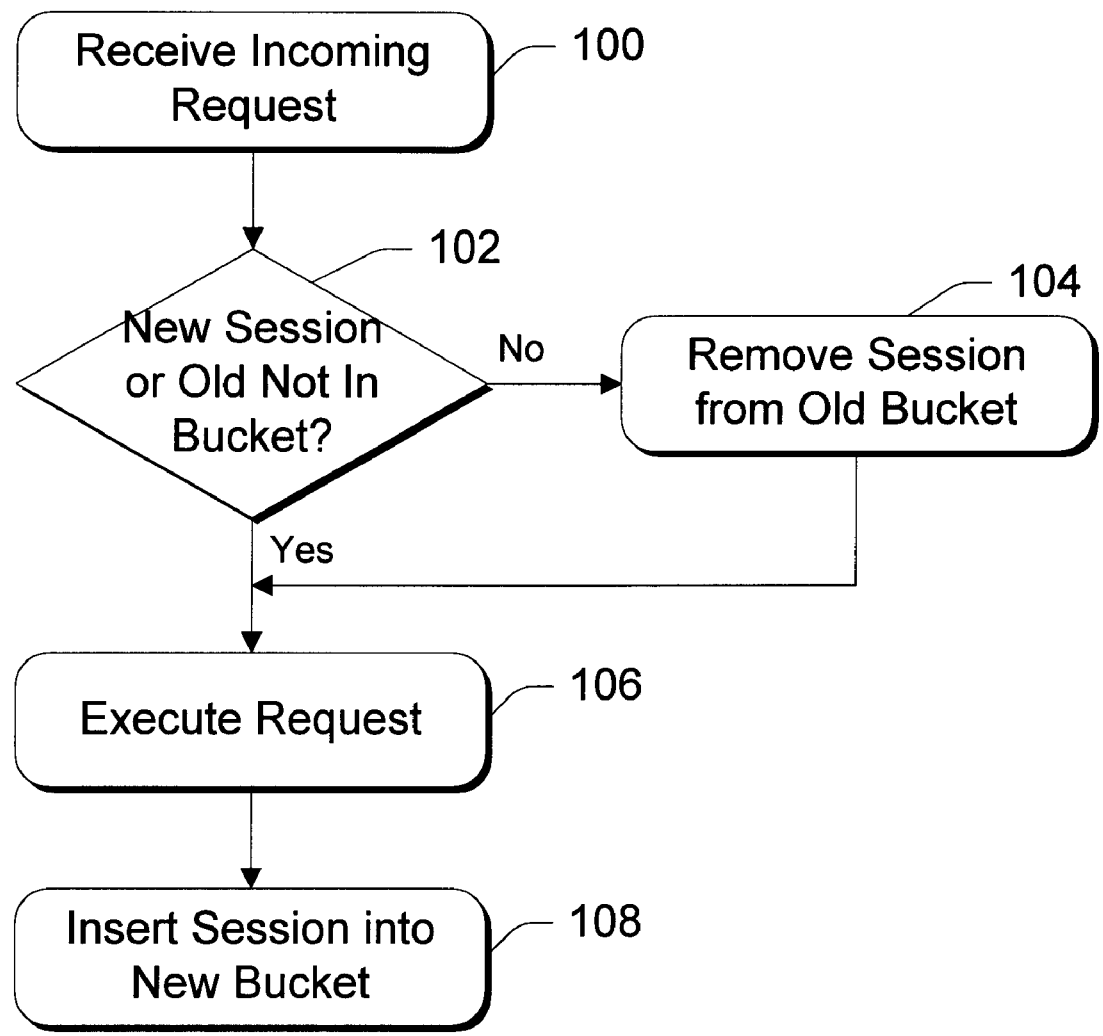
FIG. 7 shows steps in a method for managing a session when a request for the session is received.
Figure 8:
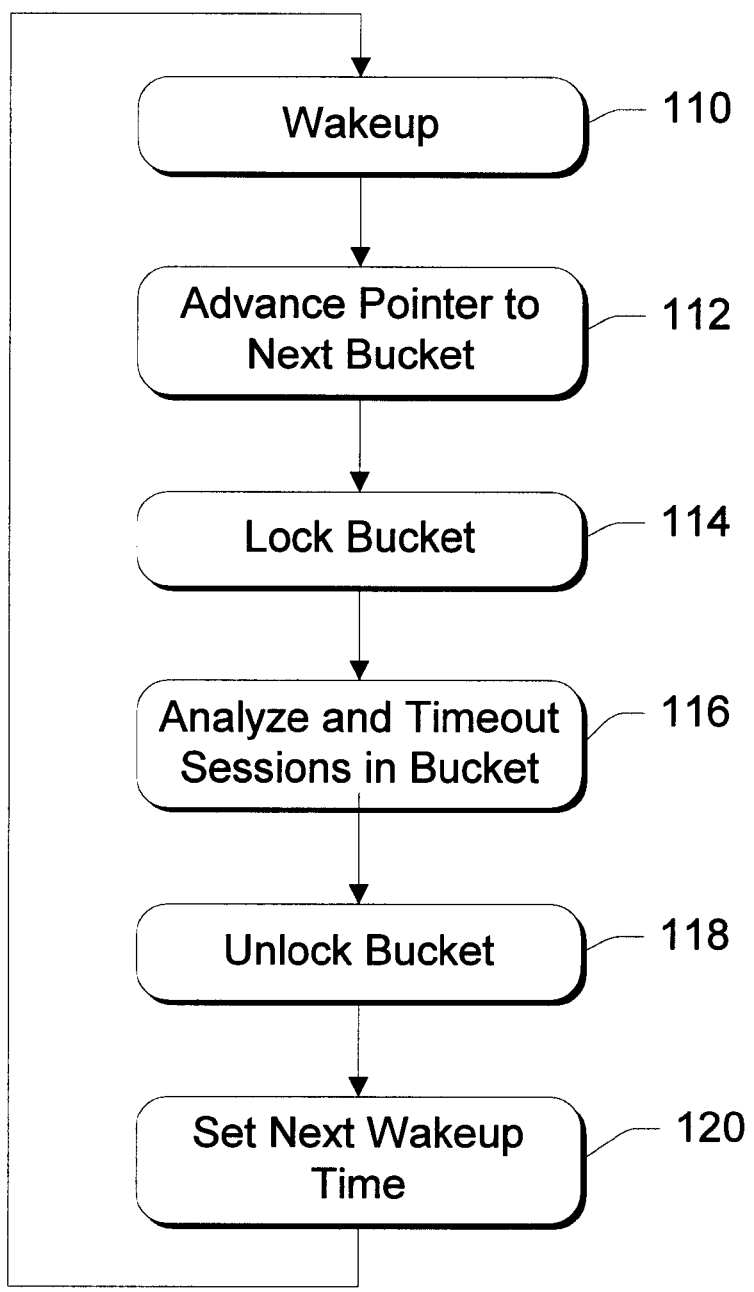
FIG. 8 shows steps in a method for timing out sessions.

FIGS. 6–8 provide one exemplary implementation of a session manager, and particularly the timeout mechanism of the session manager. FIG. 6 shows the session timeout logic of the Internet server 36. The timeout logic includes an I/O thread 60 to initially receive a request, a queue 62, a worker thread 64 to execute the request, and a session timeout thread 66 that awakes periodically to eliminate timed out sessions. In actual implementation, the three logical threads may be implemented as fewer than three physical threads. For example, the I/O thread 60 and worker thread 64 could be the same physical thread in a case when the server application does not support queuing. The session timeout thread could be implemented as a scheduled callback item that shares the physical thread with other items.

The timeout buckets 44 are shown implemented as multiple doubly linked lists of sessions contained in the session table 41. The timeout buckets 44 maintain headers and other information to locate one of the sessions in the linked list that forms the bucket. The timeout clock 42 increments a pointer 50 among the buckets 44 at each prescribed interval.

A method for handling requests using the timeout logic is described with additional reference to the flow diagram of FIG. 7. The steps are preferably implemented in software as computer-executable instructions. At step 100 in FIG. 7, the Internet server 36 receives a request from a remote client. The I/O thread 60 initially processes the request and may optionally assign the request to a particular session. The I/O thread 60 forwards the request to a queue 62 where it awaits execution.

The worker thread 64 retrieves the request from queue 62 and initially determines whether the request is associated with a new session or an old session that is not currently in a timeout bucket (step 102 in FIG. 7). For instance, it is not uncommon for the same session to receive numerous requests simultaneously. That session, albeit old, may not be in a timeout bucket when some of the requests arrive because it has already been removed.

If the request belongs to an old session currently in a timeout bucket, the worker thread 64 removes the session from the timeout bucket (step 104 in FIG. 7). With reference to FIG. 2, suppose the session is currently in bucket 2. The session is removed from bucket 2 during execution of the request. This guarantees that the session timeout thread 66 does not handle sessions for which a request is currently being executed.

At step 106 in FIG. 7, the worker thread 64 executes the request. If the session is to persist on the server, the worker thread places the session back into the appropriate timeout bucket (step 108 in FIG. 7). With reference again to FIG. 2, the session is returned to a new bucket 5 (rather than old bucket 2), because the session is refreshed for a new timeout period from the current clock pointer 50.

FIG. 8 shows a method for timing out sessions using the session timeout logic of FIG. 6. The steps are preferably implemented in software as computer-executable instructions. At step 110 in FIG. 8, the session timeout thread 66 wakes up every clock tick (e.g., every minute). The session timeout thread 66 advances the timeout clock pointer 50 by one to reference the next timeout bucket (step 112 in FIG. 8). The current bucket is then locked from receiving any new sessions (step 114 in FIG. 8). The session timeout thread 66 locks only one bucket, leaving the other buckets available to receive sessions or have sessions removed. This minimizes lock contention, which is an advantage over prior art systems that lock the entire session table.

While the timeout bucket is locked, the session timeout thread 66 analyzes each session in the bucket to determine if the session should be deleted (step 116 in FIG. 8). This analysis might include comparing the session's timeout clock value with the current timeout time, determining whether the session has any pending requests, and so forth. When the session should be deleted, the session timeout thread 66 deletes the session from the timeout bucket and the main session table 41.

After all sessions are analyzed, the session timeout thread unlocks the bucket (step 118 in FIG. 8). The session timeout thread 66 sets the next wake-up time to the next clock interval (e.g., 1 minute) after the start of the present and just finished processing run (step 120 in FIG. 8). The process is then repeated on the next bucket during the next wakeup cycle.

The timeout mechanism is advantageous over prior art approaches in many ways. One advantage is that the timeout mechanism does not affect the implementation of the main session table 41. The session table and timeout mechanism are scaleable and safe for multi-threaded access. Another advantage is that the timeout mechanism does not affect the I/O thread. The I/O thread does not try to acquire a timeout bucket lock, and thus there is no contention on these locks involving this thread. Another advantage is that it accommodates sessions with different timeout periods. For each session, the mechanism simply places the session in the appropriate bucket ahead of the pointer based on the session timeout for the session.

Another advantage is that the session timeout mechanism minimizes the possibility of lock contention over a session or bucket between the worker thread and the session timeout thread. While it is theoretically possible for a worker thread to be locked out of the timeout bucket lock, in practice it does not happen very often. One reason is that the session timeout thread is only working on one of many buckets at any one time. Accordingly, most buckets remain accessible and are not locked out during the processing cycle of the session timeout thread.

Additionally, recall that the worker thread removes all sessions being processed from their respective buckets (see step 104 in FIG. 7). For the worker thread to be in contention with the session timeout thread on the current timeout bucket, a request must arrive for a session during the very last time unit of its timeout period in order for the two threads to be accessing the same bucket. For example, if the session timeout for a particular session is five time units, the request must come exactly on the fifth clock tick after the previous request for the same session to give rise to a lock contention between the worker thread and session timeout thread. The probability of this happing for any realistic distribution of intervals between requests is quite low.

There is another possibility that the worker thread be locked out of a timeout bucket by the session timeout thread when the worker thread is attempting to insert a session into a timeout bucket. However, for this to occur, the session timeout value must equal, or be a multiple of, the number of buckets. For example, if the default timeout is five time units, the custom session timeout has to be set to six units for the lock contention to occur because only then is the session timeout thread operating on the same bucket that the worker thread is attempting to access. This condition is prevented by using the default session timeout and the number of buckets formula described above.

It is also possible for two worker threads to compete for the same timeout bucket lock. However, because the timeout buckets can be implemented as simple linked lists of sessions as shown in FIGS. 5 and 6, the duration of a timeout bucket lock acquired by a worker thread is only several instructions long.

Accordingly, the session timeout mechanism does not add to lock contention, nor does it interfere with the request processing. As a result, the session timeout mechanism is scalable. The timeout mechanism further improves throughput and scalability because it relieves the contention on the session table lock.

It is noted that the above discussion focuses primarily to managing client-server sessions. However, aspects of this invention may apply to other contexts involving time-based items. For instance, the timeout mechanism may be adapted to managing the cache entries in a cache to timeout expired items. In this context, the method entails establishing multiple buckets and inserting the time-based items (e.g., cache entries) into the timeout buckets according to respective time periods associated with the time-based items. The method then includes referencing through the buckets and analyzing the time-based items in the bucket being currently referenced for possible action.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A network server system for a computer network system to handle requests from one or more clients, the network server system comprising:
    a processing unit;
    a memory subsystem;
    a session manager stored in the memory subsystem and executable on the processing unit to manage client-server sessions, the session manager grouping the sessions into timeout buckets according to timeout periods associated with the sessions; and
    wherein the sessions have a default session timeout period expressed as whole units, and the session manager establishes a predetermined number of timeout buckets that is at least one greater than the default session timeout period.

2. A network server system as recited in claim 1, wherein the session manager analyzes individual timeout buckets to determine whether the sessions therein should be timed out.

3. A network server as recited in claim 1, wherein the session manager maintains a pointer to a current timeout bucket, the session manager having a session timeout clock that advances the pointer at a predetermined time interval to cycle through the timeout buckets, one bucket at a time.

4. A network server system as recited in claim 1, wherein upon receiving a new request for a specific session in a timeout bucket, the session manager removes the specific session from the timeout bucket and following processing of the new request, inserts the specific session into another one of the timeout buckets.

5. A network server system as recited in claim 1, further comprising a server application stored in the memory subsystem and executable on the processing unit, the session manager being incorporated into the server application.

6. A network server system as recited in claim 3, wherein upon receiving a new session, the session manager inserts the new session into one of the timeout buckets in advance of the current timeout bucket by a number of timeout buckets equal to or greater than the timeout period.

7. A network server system for a computer network system to handle requests from one or more clients, the network server system comprising:
    a processing unit;
    a memory subsystem;
    a session manager stored in the memory subsystem and executable on the processing unit to manage client-server sessions, the session manager grouping the sessions into timeout buckets according to timeout periods associated with the sessions; and
    wherein the session manager cycles through the timeout buckets one bucket at a time, pausing for a predetermined time interval between each of the timeout buckets, to analyze the sessions contained in a currently referenced timeout bucket for possible time out.

8. A session timeout system for use in a network server connected to serve one or more clients over a network, the network server establishing sessions for the clients to facilitate communication between the network server and the clients, the session timeout system comprising:
    multiple timeout buckets to hold corresponding groups of sessions according to timeout periods of the sessions so that the sessions located in different ones of the timeout buckets are set to timeout at different times, the sessions having a default session timeout period expressed as whole units and a total number of the timeout buckets number is at least one greater than the default session timeout period; and
    a session timeout clock to cycle consecutively through the timeout buckets at predefined time intervals, the session timeout clock maintaining a reference to a current bucket so that the sessions held by the current bucket are analyzed for possible timeout.

9. A session timeout system as recited in claim 8, wherein each of the timeout buckets comprises a linked list of the sessions grouped therein.

10. A session timeout system as recited in claim 8, wherein the session timeout clock cycles through the timeout buckets more than once before a particular session is timed out.

11. A session timeout system as recited in claim 8, wherein the session timeout clock maintains an absolute time measured as a number of time intervals counted since starting.

12. A session timeout system as recited in claim 8, wherein each session holds an identification of its corresponding timeout bucket and an absolute time value indicative of when the session's timeout period lapses.

13. A server application comprising the session timeout system as recited in claim 8.

14. A session timeout system as recited in claim 12, wherein both the timeout bucket identification and the absolute time value are used to determine whether the session should be timed out.

15. A server application for execution on a server that is configured to serve one or more clients, the server application having a session manager to manage sessions established to facilitate client-server connections, the session manager grouping the sessions into multiple buckets according to timeout periods associated with the sessions so that the sessions located in different ones of the timeout buckets are set to timeout at different times, the session manager maintaining a session timeout clock that increments every predetermined time unit to advance a reference among the timeout buckets so that one timeout bucket is referenced at a time, the session manager analyzing the sessions contained in a currently referenced timeout bucket for possible time out.

16. A method for managing sessions established to facilitate client-server connections, comprising the following steps:

establishing a predetermined number of timeout buckets; and inserting the sessions into ones of the timeout buckets according to respective timeout periods associated with the sessions, the sessions having a default session timeout period expressed as whole units and the predetermined number of timeout buckets being at least one greater than the default session timeout period.

17. A method as recited in claim 16, further comprising the following steps:

referencing through the timeout buckets; and analyzing the sessions associated with the timeout bucket being currently referenced for possible timeout.

18. A method as recited in claim 16, further comprising the following steps:

upon receiving a new request associated with a particular session, removing the particular session from its timeout bucket;

processing the new request; and inserting the particular session into another one of the timeout buckets.

19. An application embodied on a computer-readable medium configured to perform the steps of the method as recited in claim 16.

20. A method as recited in claim 17, wherein the referencing step comprises the following steps:

maintaining a reference to a current timeout bucket; and moving the reference from the current timeout bucket to a next timeout bucket after a predetermined time interval elapses.

21. A method as recited in claim 17, wherein the analyzing step comprises the step of timing out all sessions associated with the currently referenced timeout bucket.

22. A method as recited in claim 17, further comprising the step of removing any sessions to be timed out from the currently referenced timeout bucket.

23. A method for managing sessions established to facilitate client-server connections, comprising the following steps:

grouping the sessions into a predetermined number of multiple timeout buckets according to respective timeout periods associated with the sessions;

maintaining a reference to a timeout bucket from among the multiple timeout buckets;

moving the reference among the timeout buckets at clocked intervals, one bucket at a time;

assessing particular sessions associated with the currently referenced timeout bucket to determine whether the particular sessions should be timed out; and in an event the particular sessions associated with the currently referenced timeout bucket should be timed out, timing out the particular sessions.

24. A method as recited in claim 23, wherein the timeout period is expressed in whole units and upon receiving a new session, inserting the new session into one of the timeout buckets removed from the current timeout bucket by a number of timeout buckets equal to or greater than the timeout period.

25. A method as recited in claim 23, wherein the maintaining step comprises the step of maintaining a pointer to the timeout bucket.

26. A method as recited in claim 23, wherein each of the timeout buckets comprises a linked list of the sessions grouped therein.

27. A method as recited in claim 23, wherein the moving step comprises the step of repeatedly advancing a pointer through the timeout buckets.

28. A method as recited in claim 23, further comprising the step of locking the currently referenced timeout bucket while leaving the remaining timeout buckets unlocked.

29. A method as recited in claim 23, further comprising the step of inserting a new session into one of the timeout buckets in advance of the currently referenced timeout bucket.

30. A method as recited in claim 23, further comprising the following steps:

upon receiving a new request associated with a specific session, removing the specific session from its timeout bucket;

processing the new request; and inserting the specific session into another one of the timeout buckets.

31. A method as recited in claim 23, further comprising the step of tracking an absolute time.

32. An application embodied on a computer-readable medium configured to perform the steps of the method as recited in claim 23.

33. A method as recited in claim 31, further comprising the following steps expressing a timeout period of at least one session according to an absolute time value;

the assessing step comprises the step of comparing, when the timeout bucket holding said one session is being referenced, the absolute time value of the timeout period of said one session to the absolute time; and timing out said one session if the absolute time value of the timeout period matches the absolute time.

34. A method for managing sessions established to facilitate client-server connections, individual sessions having an associated timeout period that can be expressed in whole units of time, the method comprising the following steps:

establishing a predetermined number of timeout buckets;

incrementing a timeout clock at every predetermined time interval;

maintaining a reference to one of the timeout buckets;

sequentially advancing the reference among the timeout buckets, one at a time, with each increment of the timeout clock so that said each timeout bucket is referenced for the predetermined time interval;

inserting a new session into one of the timeout buckets in advance of the currently referenced timeout bucket; and determining whether any sessions in the currently referenced timeout bucket should be timed out.

35. A method as recited in claim 34, wherein the sessions have a default session timeout period expressed as whole units, and the establishing step comprises the step of providing a predetermined number of timeout buckets that is at least one greater than the default session timeout period.

36. A method as recited in claim 34, further comprising the step of locking the currently referenced timeout bucket while leaving the remaining timeout buckets unlocked.

37. A method as recited in claim 34, further comprising the step of tracking an absolute time with the timeout clock.

38. A method as recited in claim 34, wherein the inserting step comprises the step of inserting the new session into one of the timeout buckets in advance of the currently referenced timeout bucket by a number of timeout buckets equal to or greater than the timeout period associated with the new session.

39. A method as recited in claim 34, further comprising the following steps:

upon receiving a new request associated with a specific session, removing the specific session from its timeout bucket;

processing the new request; and inserting the specific session into another one of the timeout buckets.

40. A method as recited in claim 37, further comprising the following steps expressing a timeout period of at least one session according to an absolute time value;

the determining step comprises the step of comparing, when the timeout bucket holding said one session is being referenced, the absolute time value of the timeout period of said one session to the absolute time; and timing out said one session if the absolute time value of the timeout period matches the absolute time.

* * * * *

UNITED STATES PATENT AND TRADEMARK OFFICE
CERTIFICATE OF CORRECTION

PATENT NO.    : 6,446,225 B1
DATED         : September 3, 2002
INVENTOR(S)   : Robsman et al.

It is certified that error appears in the above-identified patent and that said Letters Patent is hereby corrected as shown below:

Title page,
Item [56], U.S. PATENT DOCUMENTS, "6,006,266" with -- 6,000,266 --.

Column 10,
Line 12, insert -- system -- between "server" and "as".

Signed and Sealed this

Fourth Day of February, 2003

JAMES E. ROGAN
*Director of the United States Patent and Trademark Office*